ROBERT RUTHERFORD.
Improvement in Grain-Meters.
No. 126,749. Patented May 14, 1872.
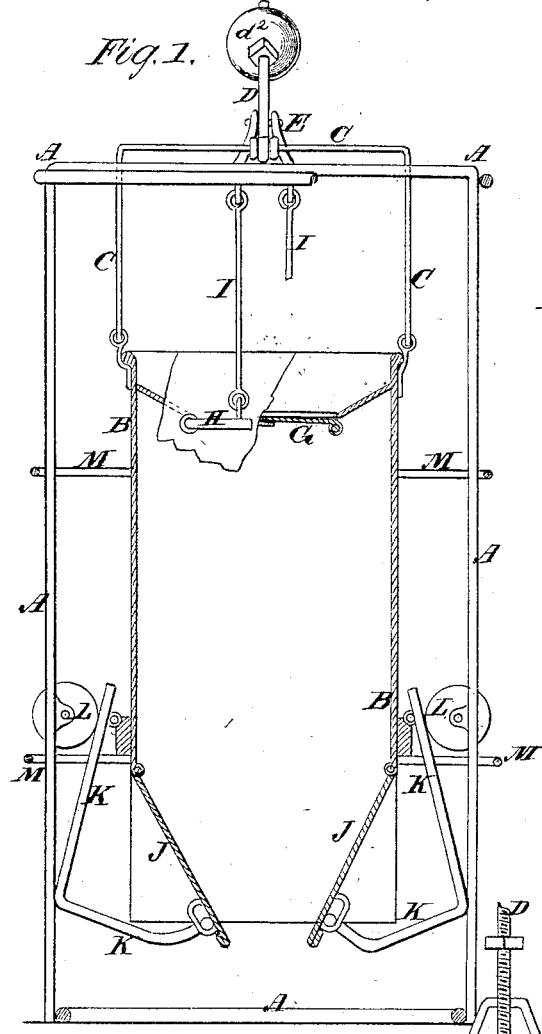
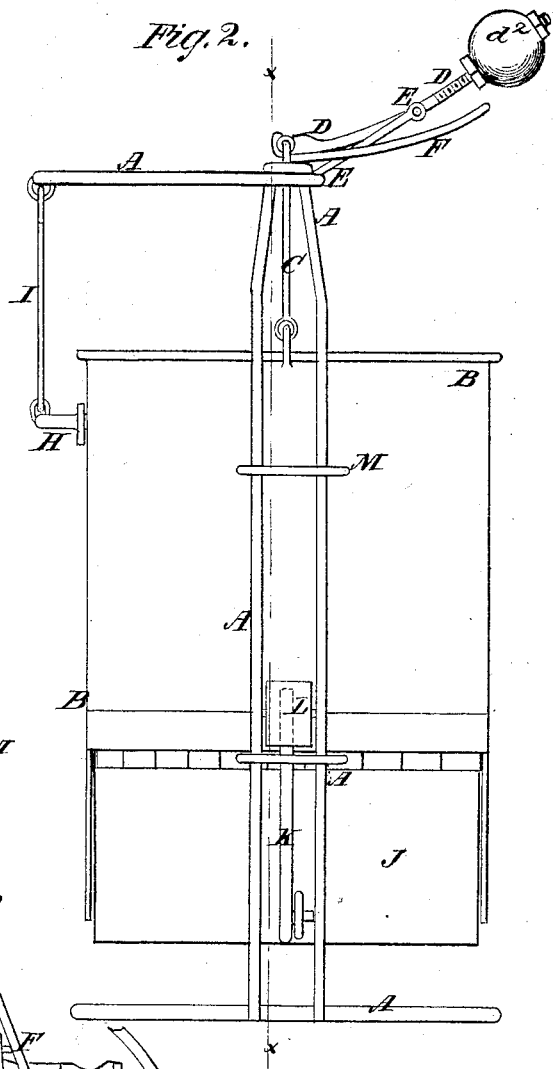
Witnesses:
John Becker
Geo. W. Mabee
Inventor:
R. Rutherford
per _____
Attorneys.

126,749

UNITED STATES PATENT OFFICE.

ROBERT RUTHERFORD, OF BELLEVILLE, ILLINOIS, ASSIGNOR TO HIMSELF AND JASPER MESSENGER, OF SAME PLACE.

IMPROVEMENT IN GRAIN-METERS.

Specification forming part of Letters Patent No. 126,749, dated May 14, 1872.

Specification describing the new and useful Improvement in Grain-Weigher, invented by ROBERT RUTHERFORD, of Belleville, in the county of St. Clair and State of Illinois.

Figure 1 is a front view of my improved machine, partly in section through the line $x\,x$, Fig. 2, to show the construction. Fig. 2 is a side view of the same. Fig. 3 is a detail top view of the same.

Similar letters of reference indicate corresponding parts.

My invention has for its object to furnish an improved apparatus for weighing grain as it comes from a thrasher, elevator, or other place, which shall be simple in construction, convenient in use, and reliable and accurate in operation; and it consists in the construction and combination of various parts of the apparatus, as hereinafter more fully described.

A is the frame-work of the machine, which must be made strong enough to sustain the amount of grain to be weighed at a time, and with a base wide enough to give it a firm and sure support. B is a box, which should be made large enough to contain the amount of grain to be weighed at a time. To the upper end of the box B is attached a bail, C, which passes up through holes or a slot in the top bar of the frame A, and to its middle part is pivoted the end of the lever or pea-bar D. The lever or bar D is pivoted to an arm or bracket, E, attached to the frame A. The lever or bar D is provided with two balls, weights, or peas, one, $d^1$, of which is designed to balance the box when no grain is in it, and the other $d^2$ is designed to weigh or balance the grain, and should be set to exactly balance the amount of grain to be weighed at a time. F is an arm or bracket, rigidly attached to the frame A to receive and stop the arm D, when the grain has been discharged from the box B, and the said box is overbalanced by the weights $d^1\,d^2$. The box B, at a little distance from its top, is closed by two doors or valves, G, which are pivoted at their outer edges to the sides of the said box B. One end of each of the pivoting rods of the valves G projects through the side of the box B, and has a crank-arm, H, attached to it. The ends of the crank-arms H are pivoted to the lower ends of the rods I, the upper ends of which are attached to the upper part of the frame A, or to a rod, arm, or bracket attached to said frame. By this arrangement, when enough grain has been received in the box B to overbalance the weights $d^1\,d^2$, the said box descends, which movement at once closes the valves G, and prevents any more grain from entering the box until the grain already there has been discharged. The bottom of the box B is formed of two doors or valves, J, which are pivoted at their outer side edges to the sides of the box B. To the under side of the valves J, near their inner edges, are pivoted the ends of the bent levers K, the other ends of which are pivoted to the sides of the box B. The upwardly-projecting arms of the levers K rest against rollers L, pivoted to the frame A. By this construction, when the box B has descended sufficiently to bring the rollers L opposite the pivots of the levers K, the valves J drop down, allowing the grain to flow out of the said box into a receiver placed beneath the apparatus to receive the weighed grain. As the box B is lightened by the escape of the grain and rises, the rollers L, operating upon the levers K, force them inward, and thus raise the valves J to their places, closing the lower end of the box B to again receive grain. The box B is kept in place as it moves up and down by keepers M attached to it, and which pass around the uprights of the frame A. By this arrangement the operation of the weigher is automatic, and all the attendant has to do is to count the number of discharges to know the exact amount of grain weighed. The counting may be done, if desired, by an indicator connected with the apparatus.

Having thus described my invention, what I claim as new, and desire to secure by Letters Patent, is—

1. The combination of the frame A, box B, bail C, balance or weighing-lever or bar D, provided with weights $d^1\,d^2$, pivoting arm E, stop-arm F, top valves G, crank-arms H, pivoted rods I, bottom valves J, bent levers K, and rollers L, with each other, substantially as herein shown and described, and for the purpose set forth.

2. The combination of the bent levers K and rollers L, with the bottom valves J of the weighing-box B, to open and close said valves by the descent and ascent of the said box B, substantially as herein shown and described, and for the purpose set forth.

ROBERT RUTHERFORD.

Witnesses:
 JASPER MESSENGER,
 CHARLES MILLER.